United States Patent [19]

Corver et al.

[11] 4,163,820

[45] Aug. 7, 1979

[54] FLAME-RETARDANT PARTICLEBOARD

[75] Inventors: Hans A. Corver; Allan J. Robertson, both of St. Catharines, Canada

[73] Assignee: American Cyanamid Company, Stamford, Conn.

[21] Appl. No.: 524,697

[22] Filed: Nov. 18, 1974

[30] Foreign Application Priority Data

Jul. 29, 1974 [CA] Canada .................................. 205863

[51] Int. Cl.² .......................... B32B 7/02; B32B 21/08
[52] U.S. Cl. .................................... 428/212; 428/326; 428/528; 428/921
[58] Field of Search ................... 252/8.1; 161/41, 146, 161/147, 162, 164, 166, 268, 403; 428/212, 326, 327, 528, 529, 538, 920, 921; 260/29.4 R, 17.3

[56] References Cited

U.S. PATENT DOCUMENTS

| | | | |
|---|---|---|---|
| 3,383,274 | 5/1968 | Craig | 161/162 |
| 3,397,035 | 8/1968 | Shen et al. | 23/106 |
| 3,397,036 | 8/1968 | Narins | 23/106 |
| 3,399,986 | 9/1968 | Wiegman | 71/74 |
| 3,415,765 | 12/1968 | Hallonquist | 260/17.3 |
| 3,438,847 | 4/1969 | Chase | 252/8.1 X |
| 3,535,199 | 10/1970 | Kühr et al | 161/162 |
| 3,635,970 | 1/1972 | Fessler | 260/249.6 |
| 3,671,376 | 6/1972 | Okazaki et al. | 161/403 |
| 3,723,074 | 3/1973 | Sears et al. | 423/307 |
| 3,846,219 | 11/1974 | Kunz | 161/162 X |
| 3,939,107 | 2/1976 | Brown | 428/921 |

*Primary Examiner*—William R. Dixon, Jr.
*Attorney, Agent, or Firm*—Frank M. Van Riet

[57] ABSTRACT

Flame-proofed particleboard wherein the layers of wood particles have crystalline, water-insoluble, ammonium polyphosphate added thereto, is disclosed.

5 Claims, No Drawings

FLAME-RETARDANT PARTICLEBOARD

BACKGROUND OF THE INVENTION

Wood particleboard has been manufactured throughout the world quite extensively over the past two decades. Particleboard, however, did not come into prominent use until decorative laminates were found to be susceptible to adherence thereto in the production of highly decorative building products. As the popularity of particleboard increased, so did the necessity for it to conform to the general standards of both universal and specific building codes and to the specific demands of the ultimate consumer. One of the prime requirements with regard to the use of particleboard, especially in the production of and the decoration of dwellings, is that of fire-retardance.

As now practiced, most methods for imparting flame-retardance to wood particleboard involve the treatment of the wood chips used with an aqueous fire-retardant solution, followed by chip drying and finally chip gluing and particleboard consolidation. Other methods wherein the wood chips are dusted with solid frame-retardant additive are also practiced although less actively. When single layer particleboard is produced in accordance with currently practiced procedures, each chip contains flame-retardant. Similarly, if a multi-layered particleboard is to be produced, every wood chip in each layer of the board contains a fire-retardant additive.

SUMMARY OF THE INVENTION

It has now been found that an effective degree of fire-retardation can be imparted to wood particleboard by incorporating crystalline, water-insoluble ammonium polyphosphate into the wood chips which go into the formation of the board. The use of ammonium polyphosphate not only imparts fire-retardance to the particleboard but achieves a degree of fire-retardance equal to or greater than previously used additives and at lesser concentrations. Furthermore, the resultant boards are leach-resistant i.e. the fire-retardant is less susceptible to being leached out of the board upon contact thereof with water than other additives. Another advantage of the use of crystalline, water-insoluble ammonium polyphosphate is that "blooming" i.e. the crystallization of fire-retardant on the board's surface, is omitted. Additionally, the ammonium polyphosphate does not interfere with the length of cycle in the board production when compared to unmodified boards as do most other additives.

DESCRIPTION OF THE INVENTION INCLUDING PREFERRED EMBODIMENTS

As mentioned above, the instant invention is directed to wood particleboard which is rendered flame-retardant by the addition of ammonium polyphosphate thereto. The particleboard may be formed by modifying, according to our invention, any well known particleboard manufacturing process such as a multi-platen process, an extrusion process, a continuous pressing process etc. including those set forth in the Wood Particleboard Handbook, Carlyle et al, the Industrial Experimental Program of the School of Engineering, North Carolina State College, Raleigh, North Carolina Publishers, August, 1956.

Generally, commercial procedures comprise first impregnating wood chips of various size with a flame-retardant additive solution, drying the impregnated chips, coating the chips with a resinous material or mixture of materials which act as a glue and heat and pressure consolidating the chips after placing them in a press between two platens of smooth surface. If multi-layer boards are produced, the outer layers are generally produced from chips having a particle size ranging from about 15 Tyler mesh to about 150 Tyler mesh while the inner core sections of the boards are comprised of chips having a particle size ranging from about 8 Tyler mesh to about 14 Tyler mesh. These multi-layer systems are produced by laying a first section of fine chips in the press followed by a second section of coarser chips. If desired, a third section or more of fine chips can then be placed over the coarse core chips. Of course, additional layers or chips of decreasingly smaller particle size can be positioned atop or beneath the core size chips in any desired configuration.

As mentioned above, crystalline, water-insoluble ammonium polyphosphate may be employed in all the layers of multi-layer or single layer particleboards or only in the outer layers of the multi-layer boards. Whether a board is to be multi-layered or single layered depends primarily on its desired thickness. When the boards are to be over $\frac{3}{8}$" thick multi-layered systems are generally preferred and, in such a board, at least about 2%, by weight, and preferably from about 2% to about 15%, by weight, based on the weight of the chips in the outer layer or layers, of ammonium polyphosphate should be employed. In boards under $\frac{3}{8}$" thick of a single layer construction, from about 2% to about 20%, by weight, based on the total weight of the chips, of the ammonium polyphosphate should be employed.

The flame-retardant additive may be applied to the wood chips which are used to form the outer layer or layers of the particleboard by any known procedure. A preferred manner of addition of the flame-retardant is as a solid. According to this method, the wood chips are contacted with the ammonium polyphosphate in a plurality of ways. For example, the solid flame-retardant may be mixed with the glue when the two are compatible and the resultant blend can then be applied to the wood chips. This method proceeds effectively when the solid ammonium polyphosphate is soluble in the glue but is relatively ineffective with insoluble forms of polyphosphate due to their tendency to form large globules in the glue, i.e. the polyphosphate is not uniformly dispersed throughout the chips and decreased flame-retardancy of the resultant particleboard results. It is also possible to add the ammonium polyphosphate after the glue is applied to the chips. This method is effective but is very difficult to control due to the tackiness of the glue. An alternative is to apply the glue and the solid ammonium polyphosphate simultaneously. This can be accomplished by spraying both the flame-retardant and the glue through separate nozzles into a container within which the wood chips are being continually agitated, such as by air currents etc. A further, and more preferred alternative, is to mix the wood chips with the ammonium polyphosphate solid in powdery form first and to then spray the resultant chips with the glue while continually agitating the chips. This method enables the flame-retardant to be more uniformly applied to the chips and prevents clumping etc. of the solid in the glue. Furthermore, the glue is also more uniformly applied.

The particle size of the crystalline, water-insoluble ammonium polyphosphate is critical in that it has been found that satisfactory results can only be achieved when the mesh size thereof is from about 25–175, preferably 40–100, Tyler mesh when using 15–150 Tyler mesh surface chips. When larger size chips are employed, the mesh size of the ammonium polyphosphate should not exceed about 200. When a larger mesh size ammonium polyphosphate is used, the fire-retardant concentrates on the outer surface of the chips as a fine white dust and when the particleboards are sanded in the finishing thereof, considerable fire-retardant is lost.

For purposes of this specification, the term "particleboard" shall be meant to include all boards prepared from wood chips or particles regardless of whether the ultimate product is referred to as chipboard, flakeboard or the like and shall include replacement of all or part of the wood chips with chips of bark, rice huskies, straw or the like.

The particular resins which are used to bond the wood chips together to produce the novel particleboard of the instant invention are not critical and such materials as animal glues, lignin, synthetic resins and the like may be used. Useful synthetic resin glues are the urea-formaldehyde resins, melamine-formaldehyde resins, phenolic resins, mixtures thereof and the like. Mixtures of these and other glues may also be used.

The crystalline, water-insoluble ammonium polyphosphate employed in the production of the novel particleboard of the instant invention is not critical with regard to the process by which it is made and, in this regard, ammonium polyphosphate prepared as disclosed in any of the U.S. Pat. Nos. 3,397,035; 3,397,036; 3,399,986 or 3,723,074 may be used without departing from the scope of the present invention. Excellent results have been achieved by using the ammonium polyphosphate designated as Form 1 in U.S. Pat. No. 3,397,035 i.e. that found by X-ray diffraction to possess a pattern having its ten strongest lines in order of decreasing intensity at 6.06; 5.47; 3.83; 3.50; 3.24; 3.42; 2.30; 3.59; 2.82 and 2.75. Ammonium polyphosphate, regardless of its specific form as defined by its X-ray diffraction pattern, has been known to impart flame-retardancy when applied to substrates such as plastics and textiles or as an ingredient in an intumescent paint but has heretofore not been known as a flame-retarding agent for wood particleboard.

Briefly, crystalline, water-insoluble ammonium polyphosphate has the general formula $H_{(n-m+2)}(NH_4)_m P_n O_{3n+2}$ wherein n is an integer having an average value greater than 10, m/n has an average value between about 0.7 and 1.1 and the maximum value of m is equal to $n+2$. It is prepared by heat treating (a) the reaction product of a condensed phosphoric acid and a combined ammoniating and condensing agent, (b) the reaction product of an orthophosphoric acid and a combined ammoniating and condensing agent, (c) an ammonium orthophosphate and a combined ammoniating and condensing agent, (d) an ammonium pyrophosphate salt and a combined ammoniating and condensing agent or (e) urea phosphate, alone or with an ammoniating and condensing agent, at up to 360° C. The typical ammoniating and condensing agent is urea.

The type of wood employed in the production of the novel particleboard of the instant invention is also not critical and such woods as pine, aspen, spruce, hemlock, ash, oak etc. can be used, each adding its own particular characteristics to the resultant product.

In a preferred embodiment of the present invention, we have found that the pH of the crystalline, water-insoluble ammonium polyphosphate should range between about 4.5 and about 6.5 as a 5% aqueous slurry. At a pH below about 4.0 e.g. at 3.0, the particleboard produced adheres to the platen using urea-formaldehyde resin glue. Furthermore, the board properties e.g. the internal bond and the delamination are very poor. Such a pH range enables the most economical usage of existing glues, resins, equipment and production conditions now commercially employed in existing manufacturing facilities. In an even more preferred embodiment, we have found that if the pH of the ammonium polyphosphate is substantially matched with the pH of the resin and the pH of the wood chips i.e. to within 0.5 unit, undergoing consolidation into particleboard, existing technology can be utilized to its fullest extent without departing from any conditions of existing procedures e.g. time of pressing cycle, etc.

It is believed that the ammonium polyphosphate as used as described herein in the production of particleboard, imparts flame-retardance to the resultant board in the following manner. When exposed to a flame, the wood temperature increases and at approximately 300° C., (below the wood decomposition temperature) the fire-retardant acts as a condensed phase by liberating a strong acid which alters the decomposition mode of cellulose to form non-flammable by-products.

Work related to fire-retardant polypropylene, on the other hand, indicates the ammonium polyphosphate by itself as an additive thereto, is of no value and must be used in conjunction with a phosphonium salt. The polyphosphate acts as a catalyst to decompose the salt to char products.

The following examples are set forth for purposes of illustration only and are not to be construed as limitations on the present invention except as set forth in the appended claims. All parts and percentages are by weight unless otherwise specified.

In the following examples, the Flame Spread Ratings are determined with a Pittsburg-Corning 30"/30° Flame Spread Tunnel which was correlated with the Underwriter's Laboratory of Canada 25 foot tunnel. On a scale based on asbestos with a Flame Spread Rating of 0 and red oak with a Flame Spread Rating of 100, particleboards with Flame Spread Ratings of 25 or less and designated as Class I boards, Flame Spread Ratings of 26–75 are designated as Class II boards and ratings of 76–150 are designated as Class III products. Repeated testing indicates that Flame Spread Ratings can be obtained from the Pittsburg-Corning tunnel with an accuracy of ±2.0 unit in the Class I range. In the upper Class II range, this accuracy is reduced.

The particleboards produced in the following examples are 18¾"×14" and are of three layer construction unless otherwise indicated. The two surface layers are formed of wood chip mixtures of about 15–150 Tyler mesh in size while the core layer utilizes chip mixtures of about 8–14 Tyler mesh in size. The boards have 20 weight percent chips and glue in the surface layers. The amount of chips and glue needed to make any given size board is readily calculatable depending on the thickness and density of the board required. These calculations are well known to those skilled in the art and need not be further elaborated upon herein.

For laboratory testing, the required amount of core chips is weighed out in a suitable vessel and charged to a suitable agitation vessel modified with a mixer for fire-retardant addition if the additive is to be applied as a solid. The core chips are then sprayed with the appropriate amount of glue while they are being agitated. After spraying, the chips and glue are allowed to mix for an additional 3-4 minutes and are then discharged. The surface chips are then contacted with the fire-retardant and the glue in a similar manner.

A mild steel plate having an appropriately sized wooden frame thereon is then placed on a scale and the first surface layer of glue and flame-retardant treated chips are weighed out and spread inside the frame and onto the plate. The core chips are then also weighed out and spread atop the first surface layer, followed by a second surface layer similar to the first. The chips and glue are then somewhat compacted and the wooden frame is removed leaving a particleboard mat around which there is then placed a steel top whose thickness is the same as that intended for the final board. A second mild steel plate is then placed on top of the mat and the entire assembly is placed on the bottom heated plate of a hydraulic press. A normal production cycle (press) is then followed. The mat is slowly compressed to the thickness of the stop over a two minute period and then held for an additional eight minutes, generally at a temperature of 280° F.–300° F. The plates and stop are then removed from the press and the particleboard recovered. The exact length of time and temperature required to properly cure any specific particleboard depends upon the glue used and the board thickness.

EXAMPLE 1

In this example, the test boards are 18"×14⅝" and are designed to have a density of 45 lb./ft.$^3$ at the beginning of the cure cycle. The glue is a mixture of 37.5 parts of a commercially available melamine/formaldehyde resin, 50.0 parts of a commercially available urea/formaldehyde resin and 12.5 parts of water and contains 60% glue solids. The wood chips used are aspen dried to about 5% moisture. The core chips pass through a No. 8 Tyler mesh screen but not through a No. 14 Tyler mesh screen. The surface chips pass through a No. 14 Tyler mesh screen but not through a No. 150 Tyler mesh screen.

127 Parts of ammonium polyphosphate, average particle size 65, designated as Form 1 and having an X-ray diffraction pattern (in order of decreasing intensity at 6.06; 5.47; 3.83; 3.50; 3.24; 3.42; 2.30; 3.59; 2.82 and 2.75) a pH of 5.5 at 5% aqueous slurry, and containing 1.0% of a commercially available silica fluidizing agent, are added to 510 parts by surface chips in a suitable rotating vessel. 169 Parts of the glue mixture are sprayed as an aerosol mist onto the chips and flame-retardant. Surface chips containing 16% flame-retardant and 12% glue solids result. 1040 Parts of core chips are then sprayed with 260 parts of the glue mixture in a similar vessel. The core chips then also contain 12% glue solids.

373 Parts of the treated surface chips are then laid in a wooden frame followed by 1115 parts of treated core chips. Finally, 373 additional parts of the same treated surface chips are used to form the top surface. The surface layers account for 40% of the total board weight.

The mat is cold pressed slightly with less than 0.5 p.s.i. pressure. The frame is removed and the mat is pressed to ⅜" thickness and is cured for 14 minutes at 260° F.

The resultant particleboard is recovered and subjected to the above-described Flame Spread Test. The Flame Spread Rating is 27. Without any fire-retardant, the rating is 90–100. No blooming of the flame-retardant additive is apparent as high humidity.

To test for water-resistance, 2"×2" sections of the board are boiled for two hours in water. The percent increase in thickness of the wet boards are set forth in Table I in addition to results of a seven day cold water leach re wet and dried boards. Comparative results utilizing other available flame-retardant additives in identical particleboards at identical concentrations are also indicated. The pH values are at 5% solution (SO) or slurry (SL).

TABLE I

| Percentage Swelling of Fire Retardant Particleboard. Boil & Leach Tests (2" × 2" Blocks) | | | |
|---|---|---|---|
| | Percentage Increase in Thickness | | |
| | After 2-hr. Boil | After 7-Day Cold Water Leach | |
| | Wet | Wet | Dry |
| No Fire Retardant | 27 | 12.0 | 6.0 |
| Diammonium Phosphate (pH 8.0-SO) | * | 19.5 | 10.0 |
| Guanylurea Phosphate (pH 4.5-SO) | 38.5 | 16.0 | 8.5 |
| Melamine Phosphate-Phosphoric Acid (pH 1.9-SL) | 36.5 | 16.0 | 7.5 |
| Ammonium Polyphosphate of Ex. 1 (pH 5.5-SL) | 33.0 | 14.5 | 7.0 |

*Specimen disintegrates during test

In a second series of tests, 3"×15" sections of board are then also subjected to the 2-Hour Boil and 7-Day Cold Water Leach Tests. The results are set forth in Table II, below, again with comparisons of other available flame-retardant additives.

TABLE II

| Percentage Swelling of Fire Retardant Particleboard. Boil and Leach Tests (3" × 15" Boards) | | | |
|---|---|---|---|
| | Percentage Increase in Thickness | | |
| | After 2-hr. Boil | After 7-Day Cold Water Leach | |
| Fire Retardant | Wet | Wet | Dry |
| No Fire Retardant | 23 | 11.0 | 4.0 |
| Diammonium Phosphate | * | 16.4 | 8.2 |
| Guanylurea Phosphate | 45 | 12.3 | 6.0 |
| Melamine Phosphate-Phosphoric Acid | 30 | 13.5 | 5.0 |
| Ammonium Polyphosphate | 26 | 12.0 | 5.0 |

*Board disintegrated during test

The 3"×15" specimens of Table II are then tested to determine their Flame-Spread Ratings after drying. The results are set forth in Table III, below.

TABLE III

| Flame Spread Rating (FSR) of Particleboard (3" × 15") Subjected to Boil & Leach Tests | | | |
|---|---|---|---|
| Fire Retardant | Original | F.S.R. After 2-hr. Boil | F.S.R. After 7-Day Leach |
| Diammonium Phosphate | 43 | * | 93 |
| Guanylurea Phosphate | 45 | 50 | 67 |
| Melamine Phosphate-Phosphoric Acid | 45 | 67 | 67 |
| Ammonium Polyphosphate of Ex. 1 | 27 | 27 | 50 |

TABLE III-continued

Flame Spread Rating (FSR) of Particleboard (3" × 15") Subjected to Boil & Leach Tests

| Fire Retardant | Original | F.S.R. After 2-hr. Boil | F.S.R. After 7-Day Leach |
|---|---|---|---|
| No Flame-Retardant | 90–100 | — | — |

*Board disintegrated during test

Two more 2"×2" specimens are cut from the board produced in Example 1 and the first is subjected to ASTM Test, , a test designed to determine the internal bonding strength (IB) of the board wherein a steel plate is bonded to each large planar surface of the specimen with epoxy resin and the plates are pulled apart to give the strength in p.s.i. necessary to destroy the board.

The second specimen is coated on one large planar side with epoxy resin and a steel plate is bonded thereto. The specimen is then clamped exactly at its "glue line" i.e. that area where the surface chips and core chips meet, and the strength in p.s.i. needed to delaminate (DL) the specimen is determined. The results of these tests as well as comparisons to specimens containing other available flame-retardant additives are set forth in Table IV, below.

TABLE IV

Board Properties Before and After Leach Tests (2" × 2" Specimens)

| | Before 7-Day Leach | | After 7-Day Leach | |
|---|---|---|---|---|
| | IB | DL | IB | DL |
| No Fire-Retardant | 130 | 150 | 70 | 75 |
| Diammonium Phosphate | 102 | 135 | 20 | 25 |
| Guanylurea Phosphate | 140 | 95 | 38 | 30 |
| Melamine Phosphate-Phosphoric Acid | 85 | 70 | 15 | 25 |
| Ammonium Polyphosphate of Ex. 1 | 125 | 140 | 65 | 80 |

EXAMPLE 2

The procedure of Example 1 is again followed except the upper surface of wood chips is omitted resulting in a two layer particleboard which has one flame-proofed surface. When the board is coated on the non-flame-proofed surface of the core with a decorative laminate using a standard contact cement, the composite is designated as Class I.

EXAMPLE 3

91 Parts of the ammonium polyphosphate of Example 1 are blended with 311 parts of chips (Tyler mesh 14-150) in a suitable vessel. 91 Parts of urea-formaldehyde (60% solids) are then sprayed onto the chips. A mat is formed as in Example 1 and is cold pressed and then pressed at 280° C. for 10 minutes to a ⅜" thickness. The resulting board contains 20% fire retardant in the surface and 12% glue solids and has a density of 45 lb./ft.³ The Flame Spread Rating is 20. Boil and Cold Water Leach tests conducted on 3"×15" samples result in values similar to those set forth in Tables I–IV when compared to other flame-retardants.

EXAMPLE 4–6

When the procedure of Example 1 is again followed except that the ammonium polyphosphate is (4) that having the following X-ray diffraction pattern 3.32; 5.47; 3.25; 5.71; 5.03; 3.87; 3.05; 3.17; 4.62; 2.40; 3.37; 3.72; 6.69; 5.37 and 3.75 (5) that having the following X-ray diffraction pattern 5.40; 4.90; 3.23; 3.20; 6.28; 3.78; 4.27; 2.75; 2.83; 9.71; 3.60; 3.39; 4.21; 3.11 and 3.32 and (6) a commercially available ammonium polyphosphate sold under the tradename Amgard IU by Erco Industries, substantially identical results are achieved.

We claim:

1. A flame-retardant particleboard comprising (1) a core of wood particles having a size of from about 8 Tyler mesh to about 14 Tyler mesh, (2) at least one outer layer on said core of wood particles having a size of from about 15 Tyler mesh to about 150 Tyler mesh, only said outer layer wood particles having (3) water-insoluble ammonium polyphosphate of from about 25–175 Tyler mesh added thereto, all of said wood particles having been glued with resin and pressure consolidated into said particleboard, wherein the pH of said ammonium polyphosphate at 5% aqueous slurry ranges from about 4.5 to about 6.5 and the pH values of said resin, said wood particles and said ammonium polyphosphate match to within about 0.5 unit.

2. A particleboard according to claim 1 wherein said flame-retardant additive is present in said resin.

3. A particleboard according to claim 1 wherein said flame-retardant additive is present in said wood particles.

4. A particleboard according to claim 1 wherein said flame-retardant additive is present as a solid on the surface of said wood particles.

5. A particleboard according to claim 1 wherein said flame-retardant additive is ammonium polyphosphate having an X-ray diffraction pattern, in decreasing order of intensity of 6.06; 5.47; 3.83; 3.50; 3.24; 3.42; 2.30; 3.59; 2.82 and 2.75.

* * * * *